(12) United States Patent
Takasu et al.

(10) Patent No.: US 7,858,551 B2
(45) Date of Patent: Dec. 28, 2010

(54) ELECTRODE CATALYST FOR ELECTROCHEMICAL REACTION, PROCESS FOR PRODUCING THE ELECTRODE CATALYST AND ELECTRODE FOR ELECTROCHEMICAL REACTION HAVING THE ELECTRODE CATALYST

(75) Inventors: Yoshio Takasu, Ueda (JP); Yasushi Murakami, Ueda (JP); Wataru Sugimoto, Ueda (JP); Yuji Yamada, Fujisawa (JP); Masaharu Uno, Fujisawa (JP); Yoshinori Nishiki, Fujisawa (JP); Tsuneto Furuta, Fujisawa (JP)

(73) Assignees: Permelec Electrode Ltd., Kanagawa (JP); Shinshu University, Nagano (JP)

( * ) Notice: Subject to any disclaimer, the term of this patent is extended or adjusted under 35 U.S.C. 154(b) by 963 days.

(21) Appl. No.: 11/715,868

(22) Filed: Mar. 9, 2007

(65) Prior Publication Data

US 2007/0212594 A1 Sep. 13, 2007

(30) Foreign Application Priority Data

Mar. 9, 2006 (JP) .............................. 2006-063586

(51) Int. Cl.
*H01M 4/88* (2006.01)
*B01J 23/40* (2006.01)
*B01J 23/42* (2006.01)
*B01J 23/48* (2006.01)

(52) U.S. Cl. .................. 502/101; 502/184; 502/185; 204/294

(58) Field of Classification Search ............... 502/101, 502/184, 185; 420/462–466, 469, 497, 501–503, 420/505, 507–511; 423/446; 204/293, 294
See application file for complete search history.

(56) References Cited

U.S. PATENT DOCUMENTS

2004/0221796 A1 11/2004 Swain et al.

FOREIGN PATENT DOCUMENTS

JP 2006-183102 A 7/2006

OTHER PUBLICATIONS

Ivandini et al., "Pt-implanted boron-doped diamond electrodes and the application for electrochemical detection of hydrogen peroxide" Diamond and Related Materials, Elsevier Science Publishers, Ansterdam, NL; vol. 14, No. 11-12; Nov. 2005, pp. 2133-2138.
El Roustom et al., "Preparation of Gold nanoparticles by heat treatment of sputter deposited gold on boron-doped diamond film electrode" Electrochemistry Communications, vol. 7, 2005, pp. 398-405.
Takasu, et al., "Catalytic Formation of Nanochannels in the Surface Layers of Diamonds by Metal Nanoparticles" Electrochemical and Solid-State Letters, vol. 9, 2006; pp. 114-117.
European Search Report dated Sep. 4, 2008.

*Primary Examiner*—Bruce F Bell
(74) *Attorney, Agent, or Firm*—Sughrue Mion, PLLC

(57) ABSTRACT

The present invention provides an electrode catalyst for electrochemical reaction, the electrode catalyst having: a conductive diamond particle having fine pores on a surface thereof; and a carbon-reactive catalyst metal in the fine pores, a process for producing the electrode catalyst, and an electrode.

2 Claims, 5 Drawing Sheets

ELECTRODE CATALYST FOR ELECTROCHEMICAL REACTION, PROCESS FOR PRODUCING THE ELECTRODE CATALYST AND ELECTRODE FOR ELECTROCHEMICAL REACTION HAVING THE ELECTRODE CATALYST

FIELD OF THE INVENTION

The present invention relates to an electrode catalyst for electrochemical reaction, which can be used for fuel cells or in an industrial process such as brine electrolysis and is excellent in the durability, a process for producing the electrode catalyst, and an electrode using the same, such as a gas diffusion electrode.

BACKGROUND OF THE INVENTION

Fuel Cell

A fuel cell can convert chemical energy to electrical energy and is a clean and highly efficient power generating system. The fuel cell produce an electric energy from an electromotive force by combining an oxidizing reaction of hydrogen and an organic carbon raw material and a reducing reaction of oxygen in air. In particular, in 1960s, it gathered attention as a low temperature battery for aero-space. Recently, it is gathering attention once more as power sources for fuel cell automobiles, small transportable power sources and home power sources. As raw materials, hydrogen and methanol are universally used. However, other organic materials such as ethanol and ethylene glycol can be used as well. Recent technical advances are detailed in books such as *Nenryodenchi Gijyutu to Sono Ooyo* (published by Technosystem (2001)), *Denchishokubai Kagaku no Shintenkai* (published by Hokkaido University (2001)) and *Nenryo Denchi* (published by Maruzen (2005)). In a gas diffusion electrode, a gas as a reaction material is supplied on a surface of an electrode to carry out an oxidizing or reducing reaction on the electrode. The gas diffusion electrode is mainly developed to apply to fuel cells.

Typical battery reaction formulas are as follows.
Anode oxidation reaction:

Hydrogen raw material: $H_2 \rightarrow 2H^+ + 2e(0.00V)$ (1)

Methanol raw material: $CH_3OH + 2H_2O \rightarrow 8H^+ + 6e + CO_3^{2-}(0.209V)$ (2)

Cathode reducing reaction:

Oxygen raw material: $4H^+ + O_2 + 4e \rightarrow 2H_2O(1.229V)$ (3)

Oxygen Gas Diffusion Electrode in Industrial Electrolysis

In recent years, it has been begun to apply a gas diffusion electrode in the industrial electrolysis. For instance, a hydrophobic cathode for carrying out a reducing reaction of oxygen is used in electrolytic producing units of hydrogen peroxide. Furthermore, in alkali production, acid or alkali recovery process, a hydrogen oxidizing reaction (hydrogen anode) in place of oxygen generation at an anode or, an oxygen reducing reaction (oxygen cathode) in place of hydrogen generation at a cathode is carried out with a gas diffusion electrode to save power consumption. It is reported that the depolarization by the hydrogen anode can be realized in metal recovery such as zinc collection and in used as a counter electrode of zinc plating.

Caustic soda (sodium hydroxide) and chlorine, which are important as industrial raw materials, are mainly produced by means of brine electrolysis. The electrolysis process has moved through a mercury process that uses a mercury cathode and a diaphragm process that uses an asbestos diaphragm and a soft iron cathode to an ion exchange membrane process that uses an active cathode small in overvoltage with an ion exchange membrane as a diaphragm. During this period, the electric power consumption rate necessary for producing 1 ton of caustic soda has been reduced to 2000 kWh. However, since the production of caustic soda is an industry that much consumes electric power, a further decrease in the electric power consumption rate is in demand.

Anode and cathode reactions in an existing electrolysis process are as shown in formulas (4) and (5), respectively, and a theoretical decomposition voltage is 2.19V.

$2Cl^- \rightarrow Cl_2 + 2e(1.358V)$ (4)

$2H_2O + 2e \rightarrow 2OH^- + H_2(-0.828V)$ (5)

When, an oxygen cathode is used at a cathode in place of carrying out a hydrogen generation reaction, a reaction becomes as shown in formula (6). In that case, the decomposition voltage becomes theoretically 1.23V, and even in a practical current density range, a bath voltage can be reduced by about 0.8V. Then, a decrease in the electric power consumption rate of 700 kWh per ton of sodium hydroxide can be expected.

$O_2 + 2H_2O + 4e \rightarrow 4OH^-(0.401V)$ (6)

Accordingly, from 1980s on, a brine electrolysis process that uses a gas diffusion electrode has been studied to put into practical use. However, in order to realize the process, an oxygen cathode that has high performance and is sufficiently stable in the electrolysis system has to be developed [oxygen gas cathodes in the brine electrolysis are detailed in *World Wide Situations of Oxygen Cathodes for Brine Electrolysis* (*Soda to Enso*, Vol. 45, 85 (1994))].

An electrolytic bath of a brine electrolysis process that uses an oxygen electrode and is most generally applied is one of a type where an oxygen cathode is disposed through a cathode chamber (caustic chamber) on a cathode side of a cationic exchange membrane and oxygen that is a raw material is supplied from a gas chamber behind the cathode. Since the electrolytic bath is constituted of three chambers of an anode chamber, a cathode solution chamber and a cathode gas chamber, it is called a three-chamber type electrolytic bath. Oxygen supplied to the gas chamber diffuses in the electrode and reacts with water in a catalyst layer to generate sodium hydroxide. Accordingly, a cathode that is used in the electrolysis process has to be a so-called vapor-liquid separation type gas diffusion electrode that sufficiently permeates only oxygen and does not leak a sodium hydroxide solution to the gas chamber. As ones that satisfy such requirements, a gas diffusion electrode where a catalyst such as silver or platinum is carried by an electrode substrate obtained by blending carbon powder and PTFE, followed by forming into a sheet is proposed.

On the other hand, there is an electrolytic bath in which an oxygen cathode is disposed in intimate contact with an ion exchange membrane (zero-gap structure), oxygen and water that are raw materials are supplied from a back surface of the electrode and sodium hydroxide that is a reaction product is recovered from the back surface or a lower portion of the electrode. When the electrolytic bath is used, a problem of the leakage of sodium hydroxide is overcome and the cathode chamber (caustic chamber) and the gas chamber are unnecessary to be separated. This is called a two-chamber type electrolytic bath because an electrolytic bath is constituted of two chambers of one cathode chamber that combines a gas chamber and a solution chamber (caustic chamber) and an anode chamber.

Performances required for an oxygen electrode suitable for an electrolysis process that uses the electrolytic bath are largely different from ones for an existing type. That is, there is no need of separating of the caustic chamber and the gas chamber with an electrode to recover a sodium hydroxide solution leaked to a back surface of the electrode; accordingly, an electrode is not necessary to be an integrated structure and can be relatively easily made larger.

Generation of Active Oxygen Species

In the fuel cell, it is reported that oxygen that is a raw material is reduced on an oxygen cathode or a hydrogen (fuel) anode that is a counter electrode to generate active oxygen species as shown by formulas (7) and (8) to destroy or consume constituent materials by oxidation.

Reference literature:
Electrochemical and Solid State Letter, 7, A474-A476 (2004)
Phys. Chem. Chem. Phys., 6, 2891-2894 (2004)
Journal of Electrochemical Society 152, A1165 (2005)

In the brine electrolysis system as well, similarly to a case of a fuel cell, there is a problem in that the lifetime and performance of a gas diffusion electrode cannot be sufficiently obtained.

Reference literature:
Journal of Electrochemical Society 152, D117 (2005)

It is known that, when an oxygen reducing reaction is carried out electrochemically, active oxygen chemical species containing hydrogen peroxide are generated. In an electrochemical reduction of oxygen, as shown in the formula (6), only four-electron reduction is expected to proceed. However, depending on a catalyst material and operation conditions, owing to formulas (7) and (8), hydrogen peroxide and superoxide ions are synthesized. A generation efficiency of hydrogen peroxide is dependent on a constituent material of the electrode and it is known that when, as a catalyst component, a carbon material, in particular, graphite is used, the generation efficiency is largely increased.

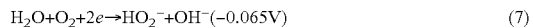
$$H_2O+O_2+2e \rightarrow HO_2^- + OH^- (-0.065V) \quad (7)$$

$$O_2+e \rightarrow O_2^{\cdot -} (-0.33V) \quad (8)$$

Hydrogen peroxide and active oxygen species react with a surface of carbon particle, a surface of carbon fiber that is a porous carrier and a surface of fluororesin or ion exchange membrane to deteriorate the hydrophobicity, oxidize and consume carbon and destroy the ion exchange membrane. As the result, a function of the gas electrode is deteriorated to result in deterioration of the electrolysis performance.

Nano materials such as fullerene and CNT are being studied as an electrode substrate. However, since these have a graphite structure, consumption and structural destruction of themselves cannot be inhibited.

Features of Diamond Material

Diamond is excellent in the thermal conductivity, optical transmittance and durability at high temperatures and to oxidation, and the electroconductivity thereof can be controlled in particular by means of doping. Accordingly, it has been expected as promising as a semiconductor device and an energy conversion element. In JP-A-58-1060379, an application as a sensor of a diamond electrode to which the electroconductivity is imparted by ion injection is disclosed.

In *Journal of Electrochemical Society* 141, 3382 (1994), the stability in an acidic electrolytic solution of diamond as an electrochemical electrode is reported and it is suggested that diamond is far more excellent than other carbon materials. Fundamental electrochemical characteristics are detailed in *Denkikagaku Oyobi Kogyobuturikagaku*, p389, Vol. 67, No. 4 (1999).

U.S. Pat. No. 5,399,247 suggests that organic wastewater can be decomposed with diamond as an anode material. JP-A-2000-226682 proposes a method where conductive diamond is used in an anode and a cathode to electrochemically process organic materials.

*Journal of Electrochemical Society*, 145, 1870 (1998) reports that diamond is small in the generation capability of hydrogen peroxide. On the other hand, diamond itself is low in the catalyst capacity in the oxygen reducing reaction and oxidation of hydrogen; accordingly, the diamond can be preferably used as a carrier of other active electrode catalyst.

*Journal Electrochemical Society*, 152, B369 (2005) proposes the efficacy of diamond powder in a fuel cell. However, there is no disclosure of a producing method of a practical catalyst.

Technologies for utilizing diamond as a carrier of an electrode catalyst are disclosed as follows.

JP-A-2004-235080 discloses, based on a technology that in a diamond synthesis due to the CVD a catalyst metal that is an undercoat aggregates, a catalyst joined fuel cell electrode having a catalyst layer on a surface of conductive diamond is disclosed.

Japanese Patent Application National Publication (laid-open) No. 2001-519594 discloses, as an electrochemical battery, a nano-structure element containing a needle-like microstructure carrier whisker that supports needle-like ultra-fine catalyst particles and describes diamond as a potential inorganic material for producing a microstructure. An aspect ratio (length to diameter) of the microstructure is preferably in the range of about 3:1 to about 100:1 and the disclosure is restricted to a shape of whisker.

JP-A-2004-6240 discloses to use diamond prepared by plasma CVD as an electrode active material.

JP-A-2001-348296 discloses diamond having a needle-like surface, carbon based materials having a ciliary surface, a producing method thereof, and electrodes that use these.

*Advanced Material*, 6, 444 (2000) describes a producing method of a honeycomb-shaped diamond electrode, in which a diamond surface provided with a porous masking material is etched with oxygen plasma to form a honeycomb-shaped diamond electrode having, according to a mask specification, a pore of several tens nanometer and a pitch of around 100 nm (depth: several micrometers). *Journal of Electroanalytical Chemistry*, 514, 35-50 (2001) reports a technology with which other catalyst such as platinum is formed on the foregoing diamond electrode.

In order to utilize diamond as a carrier of an electrode catalyst, the followings are required or much preferred.
(1) having a fine shape of 1 nm to 1 μm,
(2) having the mechanical strength,
(3) being able to reduce an amount of catalyst used, and
(4) allowing readily mass-producing However, above-disclosed technologies do not necessarily satisfy all of these. It is considered that, since the diamond is stable, it is very difficult to apply a surface oxidation process or an etching process for fixing a catalyst, and thereby a small pore for stably holding a catalyst (anchor effect) cannot be obtained.

From such situations, it is demanded to use diamond particles in which a catalyst is highly dispersed and stabilized as a gas diffusion electrode in fuel cells and industrial electrolysis.

SUMMARY OF THE INVENTION

Accordingly, the invention intends to overcome problems of the existing technologies and to provide: an electrode catalyst for electrochemical reaction, which contains conductive diamond particles that have a lot of fine pores on a surface thereof and contain in a highly-dispersed state a particulate or powdery metal or metal alloy catalyst; a producing method thereof; and an electrochemical electrode that uses the electrode catalyst.

The present inventors have made eager investigation to examine the problem. As a result, it has been found that the foregoing objects can be achieved by the following electrode catalyst, process for producing the electrode catalyst, and electrode. With this finding, the present invention is accomplished.

The present invention is mainly directed to the following items:

1. An electrode catalyst for electrochemical reaction, the electrode catalyst comprising: a conductive diamond particle having fine pores on a surface thereof; and a carbon-reactive catalyst metal in the fine pores.

2. The electrode catalyst according to item 1, wherein a representative diameter of the fine pores is 1 nm to 10 μm.

3. The electrode catalyst according to item 1, wherein the carbon-reactive catalyst metal is at least one of: at least one metal selected from the group consisting of platinum, gold, silver, copper, palladium, ruthenium and iridium; and an alloy of at least one metal selected from the group consisting of platinum, gold, silver, copper, palladium, ruthenium and iridium.

4. A process for producing an electrode catalyst for electrochemical reaction, the process comprising: forming a thin layer containing a carbon-reactive catalyst metal component on a conductive diamond particle as a base material; and heat-treating the conductive diamond particle having the thin layer in a reducing gas atmosphere to carry out a carbon reducing reaction due to the catalyst metal so as to form fine pores on a surface of the conductive diamond particle and to carry the catalyst metal in the fine pores.

5. The process for producing an electrode catalyst according to item 4, wherein a temperature of the heat-treatment is 600 to 900° C.

6. An electrode for electrochemical reaction, the electrode comprising: an electrode substrate; and a mixture of the electrode catalyst according to item 1 and a binder, the mixture being carried on a surface of the electrode substrate.

In what follows, the invention will be detailed.

An electrode catalyst for electrochemical reaction of the invention is a catalyst in which in fine pores on a surface of conductive diamond particles a carbon-reactive metal catalyst is carried. The diamond particles of the invention include ordinary diamond particles and diamond-like carbon (DLC) particles.

The catalyst that carries a carbon-reactive metal catalyst in fine pores on a surface of the conductive diamond particles can be produced by, for instance, forming a thin layer containing a carbon-reactive catalyst metal component on the diamond particles, followed by heat-treating in a reducing gas atmosphere. Owing to the heat treatment, a carbon reduction reaction of the conductive diamond particles is carried out by the catalyst metal to form fine pores on the diamond surface and simultaneously or slightly belatedly the catalyst metal is carried in the fine pores, thereby above-mentioned electrode catalyst for electrochemical reaction is obtained.

Thus obtained electrode catalyst is blended with a binder, followed by covering a surface of an electrode substrate, and thereby an electrochemical reaction electrode can be obtained. The electrode can be preferably used not only as electrodes for brine electrolysis and fuel cells but also in various industrial electrolyses such as water processing, ozone producing electrolysis, organic matter electrolysis, metal sampling and electrolytic plating. The producing method of the invention can be applied as well to a production of a large-scale diamond electrode and can largely improve the productivity.

Furthermore, the electrochemical electrode, without restricting to the electrolysis, can be used as well as analytical electrodes such as sensors. In this case, owing to an increase in the specific surface area, an improvement in the sensitivity can be expected.

A representative diameter (90% or more of all pores) of the fine pores thus formed is preferably controlled to be in the range of 0.5 to 100 nm. The heat treatment temperature is preferably set at 600 to 900° C. and a catalyst metal is preferably at least one metal selected from the group consisting of platinum, gold, silver, copper, palladium, ruthenium and iridium and/or alloys thereof.

In the invention, a kind and an amount of a carbon-reactive catalyst metal component contained in a thin layer on a surface of the conductive diamond particles determine diameters and a distribution of fine pores, and, when these are appropriately controlled, fine pores of number and diameter close to desired values can be formed. Furthermore, a depth of the fine pore as well is largely affected by the kind of the catalyst metal component (carbon reactivity), the larger the reactivity is, the deeper the depth tends to be.

A dimension and a degree of dispersion of pores to be formed are preferred to be controllable depending on an object. At high temperatures, metal moves toward grain boundaries, edges, kinks and steps to aggregate; accordingly, a pore formation reaction is likely to proceed along a particular crystal orientation and a dimension of pore generated tends to be larger.

Since, like this, on a surface of conductive diamond particles, a thin layer containing a carbon-reactive catalyst metal component is formed, followed by applying heat treatment, it is considered that the carbon-reactive catalyst metal component removes carbon on a surface of conductive diamond particle to form a fine pore. Accordingly, conductive diamond particles on which fine pores are formed at atomic level or a level close thereto can be obtained.

A shape of a fine pore in the invention is not restricted particularly and contains all concave pores that can be formed owing to a reaction with the catalyst metal such as a hemisphere, a cylindrical column hemispheric at bottom end, a polygonal column hemispheric at bottom end, a downward cone and a groove having an oval sectional shape.

A reason for a fact that the catalyst metal is precipitated approximately selectively in the formed fine pores and is not precipitated on a surface of the conductive diamond particle is inferred that a carbon reducing reaction of the conductive diamond particle proceeds in the neighborhood of the catalyst metal and at a center of a formed fine pore the catalyst particle stays always.

As mentioned above, according to the invention, an electrode catalyst for electrochemical reaction in which conductive diamond particle more enduring than other carbon materials are used and an active metal catalyst is remained and fixed in fine pores of the conductive diamond particle which are produced owing to a carbon reducing reaction with metal or metal alloy as a catalyst can be provided.

The metal catalyst carried in the fine pores is higher in the stability of the catalyst (aggregation inhibition, falling out inhibition) than the metal catalyst carried on a surface of the particle and can achieve higher activity and longer lifetime at a smaller amount of metal; accordingly, a usage amount of expensive metal can be reduced. As the result, the electrode produced with the electrode catalyst is higher in the durability and can be preferably used in the brine electrolyses that are severe in the electrolysis conditions or fuel cells.

Furthermore, a producing method of the electrode catalyst is more convenient and less expensive than an existing producing method and suitable for mass-production.

Figure 1:
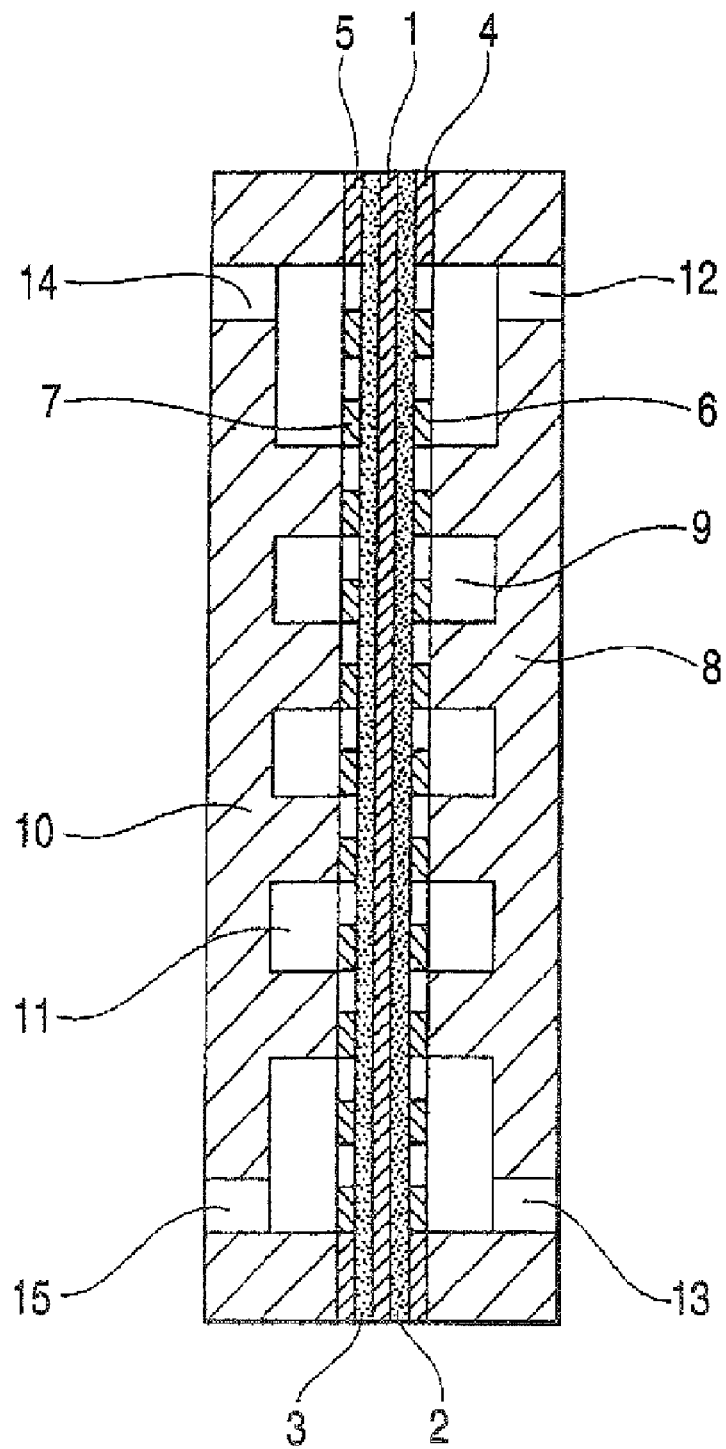
FIG. 1 is a schematic sectional view exemplifying a fuel cell that uses a gas diffusion cathode of the invention.

The reference numerals used in the drawings denote the followings, respectively.

1: ion exchange membrane
2: oxygen electrode
3: hydrogen electrode
6: oxygen electrode current collector
7: hydrogen electrode current collector
9: oxygen electrode chamber
11: hydrogen electrode chamber
21: three-chamber electrolytic bath
22: ion exchange membrane
23: anode chamber
24: cathode chamber
25: anode
26: gas diffusion cathode
27: cathode solution chamber
28: cathode gas chamber
31: two-chamber electrolytic bath
32: ion exchange membrane
33: anode chamber
34: cathode gas chamber
35: anode
36: gas diffusion cathode

DETAILED DESCRIPTION OF THE INVENTION

In what follows, the respective elements of an electrode catalyst of the invention and producing methods thereof, an electrode that uses the electrode catalyst and an electrolytic bath that uses the electrode will be further detailed.

Catalyst Metal

In the invention, as typical examples of catalyst metals for fuel cells, transition metals are cited. The catalyst metal is preferably selected from ruthenium, platinum, gold, silver, palladium and iridium and platinum is more preferably selected. Furthermore, an alloy made of at least two kinds including the metals may be used as an alloy catalyst.

In a hydrogen anode catalyst of a fuel cell, adsorbed materials such as CO contained in raw material hydrogen adversely affect on the catalyst characteristics; accordingly, an impurity content in the raw material is normally controlled to 10 ppm or less with various removing units. In a methanol fuel cell, CO generated by methanol oxidation in a process of a reaction is adsorbed to deteriorate the performance.

Furthermore, it is reported that, even when there is no CO, owing to long usage, the catalyst metal sinters to deteriorate the performance. Since there is such a defect in a simple catalyst such as platinum, binary and multi-component catalysts are developed and reported to exert excellent characteristics. As a typical composition, a Pt—Ru alloy catalyst is well known to be excellent in the CO resistance and it is confirmed that when a Pt—Ru catalyst having a particle size of 2 to 3 nm is dispersed on carbon, the CO resistance is improved owing to alloying.

A kind of a catalyst that is used in a gas diffusion cathode for oxygen reduction of the invention can be appropriately selected depending on an application thereof. However, a catalyst for brine electrolysis is preferable to be stable in a high temperature alkali and cheap; accordingly, silver or silver alloys (slightly containing copper, platinum, palladium) are preferably selected. It is reported that, after long usage, the catalyst metal proceeds in the sintering to deteriorate the performance; accordingly, an alloy catalyst can be effectively used.

An amount of the electrode catalyst is in the range of 1 to 100 $g/m^2$ (per apparent unit surface area of conductive diamond particles), or a volume ratio of the electrode catalyst to diamond is preferably set at (0.001 to 1): 1.

Conductive Diamond Particle

In order to obtain diamond particles, there are existing methods such as an impact method (explosive welding method), a high pressure and high temperature diamond powder synthesis method (HPHT method) and a plasma arc jet method. These are not particularly restricted. A particle size is preferably in the range of 1 nm to 10 μm. For instance, as particulate material, diamond fine particles of nano-order are industrially produced a lot for polishing agent, these can be used as a gas electrode material without quality problem; accordingly, a new market can be provided.

Since the diamond particles obtained according to the above method are not conductive, an element having trivalent or pentavalent valence electrons such as boron, phosphorus or nitrogen has to be added to render conductive, an amount thereof being preferably in the range of 100 to 10000 ppm to carbon. The diamond particles of the invention are preferred to have bonds other than sp³ bond that has the chemical stability as small as possible.

Method of Forming Catalyst

In the inventive method, in the beginning, on a surface of conductive diamond particle, a thin layer made of a metal compound itself such as metal nitrate that is a catalyst precursor or a solvent containing the metal compound is formed. This can be formed as shown below. That is, the conductive diamond particles and a solvent containing the metal compound are blended, followed by drying at a temperature in the range of room temperature to 90° C., alternatively, a colloidal solution of an intended catalyst metal is coated.

In the next place, the conductive diamond particles provided with the thin layer are heat treated in a reducing gas atmosphere.

The heat treatment may be applied under pressure or reduced pressure. However, usually, it is carried out under normal pressure of 0.1 MPa. A reducing gas such as hydrogen is blended with an inert gas such as nitrogen and supplied to a reactor. Ratios of a reducing gas and an inert gas, respectively, are preferably in the range of 3 to 30% and 70 to 97%. Depending on a reaction time, the width and depth of fine pore vary and the reaction time is usually preferably set in the range of 1 to 10 hr.

A heating temperature is preferred to be in the range of 600 to 900° C. When it is lower than 600° C., the reaction processing time increases to be impractical. On the other hand, when it is higher than 900° C., although the processing time can be shortened, fine pores are excessively formed to deteriorate the mechanical strength of the diamond layer and the diamond base material tends to be corroded and rendered brittle by hydrogen.

Depending on the conditions, the number and shape of the fine pores can be varied, that is, a typical diameter thereof (90% or more of total fine pores) can be controlled in the range of 1 to 100 nm and the pore depth can be controlled in the range of 10 to 100 nm. When the pore diameter is smaller than 1 nm, an electrolytic solution cannot intrude to result in incapability of obtaining a remarkable advantage in the application to the electrochemistry. On the other hand, though a pore larger than 100 nm would be formed, a particle size of the diamond particle on which fine pores are formed is in the range of 1 nm to 1 µm; accordingly, there is no practical meaning of applying the invention. When the pore depth is deeper than 100 nm, though depending on the ratio with the pore diameter, there is formed some portion that does not effectively contribute to the electrochemical reaction.

As a reducing reaction of diamond carbon that is in contact with a metal particle catalyst, for instance, a reaction below is considered. Generated methane is a gas and leaves from a superficial surface of the diamond layer to form a fine pore where the gas left.

$$C + 2H_2 = CH_4 \quad (9)$$

After the formation of pore, in some cases, metal particles remain on a surface of diamond. These can be dissolved by acid and are preferred to remove before usage as an electrode.

Catalyst-Resin Paint

In order to use thus formed catalyst carrying conductive diamond particles as a gas diffusion electrode, according to a known technology, the conductive diamond particles and a fluorinated hydrophobic resin (binder) are added to a solvent such as water or organic solvents to prepare paint. As the hydrophobic resin, commercially available products such as PTFE, FEP, PFA and PVDF can be cited. A volume ratio of the catalyst particles and the hydrophobic resin is preferably in the range of 1:0.01 to 1:1.

For instance, when an electrode for a fuel cell is prepared, the paint is coated on interior and exterior surfaces of a hydrophobic and porous material provided with a three-dimensional gas flow passage, followed by drying and calcining at a temperature in the range of 120 to 370° C. Thereby, a gas diffusion electrode having a reaction layer in which a catalyst is formed can be obtained. When a polymer solid electrolyte component is used as a paint component, an effective electrode area can be increased and thereby the performance can be expected to improve. The paint can be coated on a polymer electrolyte membrane (ion exchange membrane) other than the porous material.

When the coating, drying and calcining are carried out divided into several times, a homogeneous catalyst layer can be particularly preferably obtained. In order to homogeneously disperse the diamond particles, a surfactant can be preferably used at an appropriate concentration. As the surfactant, a nonionic type such as Triton (trade name) is preferred.

Electrode Substrate

The paint is normally coated on an electrode substrate. In order to increase an effective area of an electrode as well, an electrode substrate is preferred to be porous and a shape thereof is particle, fiber, plate or plate with hole.

As a porous conductive substrate, materials such as carbon cloth and fiber sintered body can be used. The conductive materials are preferred to have appropriate porosity to supply or remove gas and liquid and to maintain sufficient electroconductivity. It is preferred that a thickness thereof is in the range of 0.01 to 5 mm, the porosity is in the range of 30 to 95% and a representative pore diameter (90% or more) is in the range of 0.001 to 1 mm.

The carbon cloth can be obtained by bundling several hundreds carbon fibers such thin as several micrometers, followed by forming into a fabric. The carbon cloth, being a material excellent in the vapor/liquid permeability, can be preferably used as the substrate. The carbon paper can be obtained by forming carbon raw material fibers into a thin film precursor by means of a papermaking method, followed by calcining this and is a material that can be preferably used. The carbon material is conductive but inferior to metal in the electroconductivity and it is difficult to make it 1 mΩcm or less.

Accordingly, in order to improve the performance, in particular, the electroconductivity of the carbon materials, the press working is preferably applied. When the carbon material is compressed by the press working, the electroconductivity is improved as a whole, an electroconductivity variation when it is used under pressure can be reduced and a joining degree of the catalyst and the electrode substrate is improved to contribute to improve the electroconductivity. Furthermore, owing to the compression of the electrode substrate and the catalyst layer and an improvement in the joining degree of the catalyst and the electrode substrate, supply capacity of raw material oxygen gas is improved as well. As a press working device, known devices such as a hot press and a hot roller can be used. The press conditions of a temperature from room temperature to 360° C. and pressure from 0.1 to 5 MPa are preferred.

Fuel Cell

The electrode for electrochemical reaction of the invention can be used as mentioned above for various kinds of electrolyses and electrochemical reactions. However, electrodes for fuel cells and brine electrolysis that are typical applications will be detailed.

FIG. 1 is a schematic sectional view exemplifying a fuel cell that uses the gas diffusion electrode of the invention. On both surfaces of an ion exchange membrane 1 that works as a polymer solid electrolyte, plate-like oxygen electrode (cathode) 2 and hydrogen electrode (anode) 3 that are respectively a gas diffusion electrode come into intimate contact with the ion exchange membrane 1 with the respective reaction layer sides disposed inside to form a structure where the both electrodes sandwich the ion exchange membrane 1 in an intimate contact state (membrane-electrode assembly, MEA).

The both electrodes 2 and 3 are formed in such a manner that catalyst particles made of conductive diamond particles that carry catalyst metal in fine pores formed on a surface thereof are coated together with a binder such as a resin on an electrode substrate such as carbon paper, followed by calcining.

In order to make operate as a battery, the respective electrodes 2 and 3 are preferably stacked and pressure bonded with the ion exchange membrane (polymer solid electrolyte film) 1. In the process, the film is preferably heated to a temperature where the film becomes plastic, followed by pressure bonding. The conductive diamond particles can be directly formed on the ion exchange membrane 1. In this case, a membrane in which a catalyst is formed with a hydrophobic material sandwiched therebetween as a gas supply layer may be integrated with the ion exchange membrane 1. A preferable temperature at heating is different depending on a material of the membrane. However, a temperature where the membrane material is softened or semi-molten at the time of pressure bonding and that is lower than a decomposition temperature is preferred. An electrolyte membrane of perfluorosulfonate polymer is preferably heated in the range of 100 to 150° C. With two of the above electrodes prepared, a structure where an electrolyte is sandwiched with reaction layer sides of the electrodes disposed inside (MEA) is formed.

With peripheral borders of surfaces opposite to the ion exchange membrane 1 of the respective oxygen electrode 2 and hydrogen electrode 3, frame-shaped oxygen electrode gasket 4 and hydrogen electrode gasket 5 are brought into intimate contact. Inner periphery sides of the respective oxygen electrode gasket 4 and hydrogen electrode gasket 5, porous oxygen electrode current collector 6 and hydrogen electrode current collector 7 are disposed so as to come into contact with the oxygen electrode 2 and hydrogen electrode 3.

A periphery of an oxygen electrode frame 8 provided with a plurality of concave surfaces formed on a side facing an ion exchange membrane comes into contact with the oxygen electrode gasket 4, and, between the oxygen electrode frame 8 and the oxygen electrode 2, an oxygen electrode chamber 9 is formed.

On the other hand, a periphery of a hydrogen electrode frame 10 provided with a plurality of concave surfaces on a side facing the ion exchange membrane comes into contact with the hydrogen electrode gasket 5 to form a hydrogen electrode chamber 11 between the hydrogen electrode frame 10 and the hydrogen electrode 3.

A reference numeral 12 denotes an oxygen gas inlet port opened level at an upper portion of the oxygen electrode frame 8, a reference numeral 13 denotes an unreacted oxygen gas and generated water outlet port opened level at a lower portion of the oxygen electrode frame 8, a reference numeral 14 denotes a hydrogen gas inlet port opened level at an upper portion of the hydrogen electrode frame 10 and a reference numeral 15 denotes an unreacted hydrogen gas outlet port opened level at a lower portion of the hydrogen electrode frame 10.

To the oxygen electrode 2 and the hydrogen electrode 3 thus configured fuel cell, an oxygen-containing gas and hydrogen that is a fuel are supplied respectively. A supply amount of hydrogen is preferred to be about 1 to 2 times a theoretical value. As the hydrogen gas that is fuel, natural gas and hydrogen gas generated by modifying petroleum may be used. Although a mingling ratio of CO is reduced as far as possible, it can be allowed up to about 10 ppm. The supply gas is, as needs arise, subjected to a moist process. A supply amount of oxygen as well is preferred to be about 1 to 2 times a theoretical value. As the oxygen gas that is fuel, air and a commercially available bomb may be used. However, oxygen concentrated from air by use of a PSA unit may be used. In general, as the oxygen concentration becomes higher, a current can be flowed at a larger current density.

When the gases are supplied, on a hydrogen electrode side, hydrogen is dissociated into a hydrogen ion and an electron. The electron is supplied from a hydrogen electrode terminal to an external load to impart energy, followed by going through an oxygen electrode terminal to an oxygen electrode to react with supplied oxygen and a hydrogen ion permeating through an ion exchange membrane from a hydrogen electrode to form water.

The catalyst used in the oxygen electrode 2 and hydrogen electrode 3, being carried in fine pores of conductive diamond particles, is excellent in the durability, and thereby the catalyst activity can be maintained for long.

Cell for Brine Electrolysis

An example of a brine electrolytic bath provided with an electrode of the invention will be described with reference to FIGS. 2 and 3.

Figure 2:
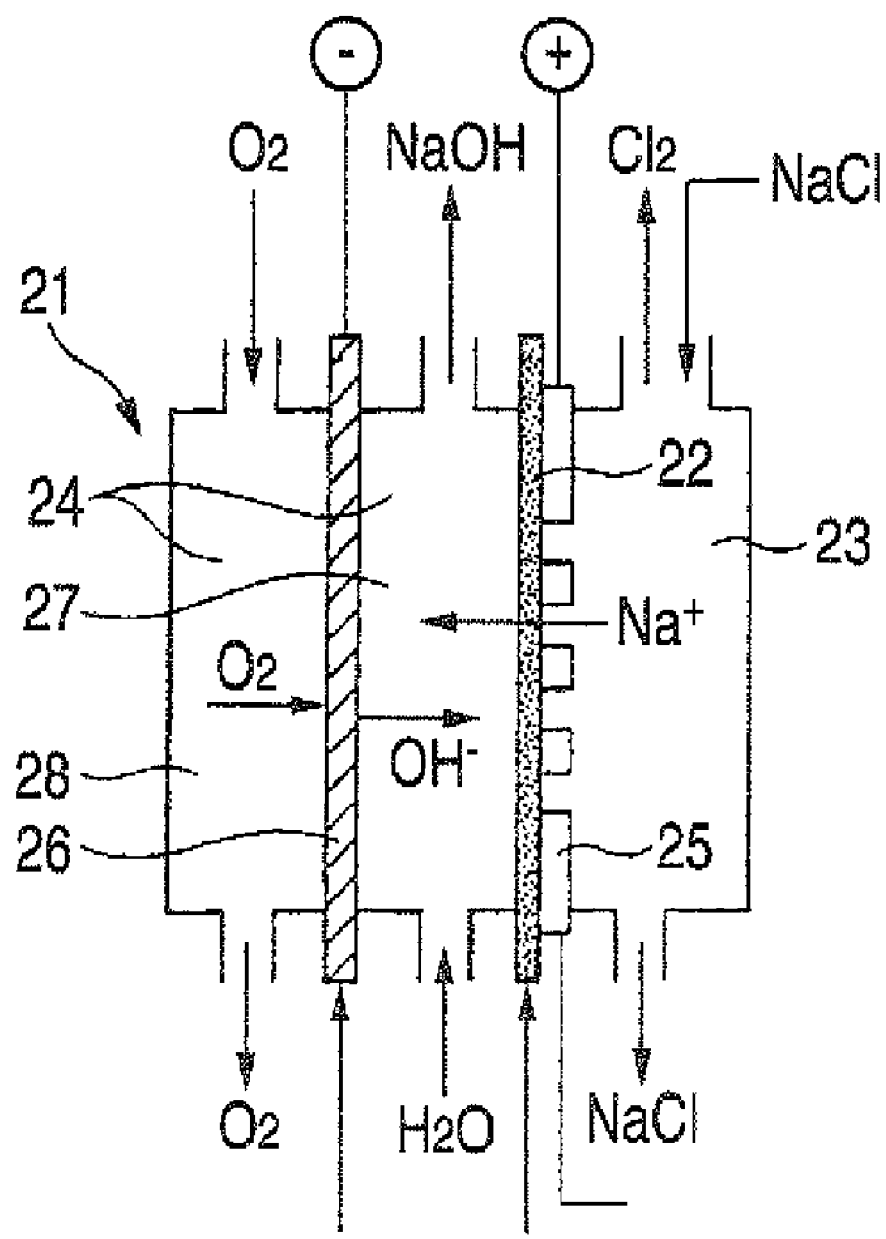
FIG. 2 is a schematic view exemplifying a three-chamber brine electrolytic bath provided a gas diffusion cathode of the invention.

FIG. 2 is a schematic diagram exemplifying a three-chamber brine electrolytic bath provided with a gas diffusion cathode of the invention.

A three-chamber electrolytic bath 21 is partitioned, with a perfluorosulfonate cation exchange membrane 22, into an anode chamber 23 and a cathode chamber 24. On an anode chamber 23 side of the cation exchange membrane 22, a porous and dimension-stabilized anode 25 is brought into intimate contact therewith. On a cathode chamber side of the cation exchange membrane 22, with a gap, a gas diffusion cathode 26 is disposed, and the gas diffusion cathode 26 partitions the cathode chamber 24 into a cathode solution chamber 27 on the cation exchange membrane 22 side and a cathode gas chamber 28 on the opposite side. The gas diffusion cathode 26 is produced in such a manner that for instance metal catalyst particles made of conductive diamond particles that carry catalyst metal in fine pores on a surface thereof are coated together with a binder such as a resin on an electrode substrate such as carbon paper, followed by calcining.

When energizing between both electrodes while supplying brine, a diluted aqueous solution of sodium hydroxide and an oxygen-containing gas, respectively, to the anode chamber 23, the cathode solution chamber 27 and the cathode gas chamber 28 of the electrolytic bath 21, a sodium ion generated in the anode chamber 23 goes through the cationic exchange membrane 22 to reach the cathode solution chamber 27. On the other hand, oxygen in the oxygen-containing gas supplied to the cathode gas chamber 28 diffuses through the gas diffusion cathode 26 to react with water to be reduced due to catalyst particles such as silver in the electrode catalyst layer to a hydroxy ion, followed by moving to the cathode solution chamber 27 to bind with the sodium ion to generate sodium hydroxide.

Figure 3:
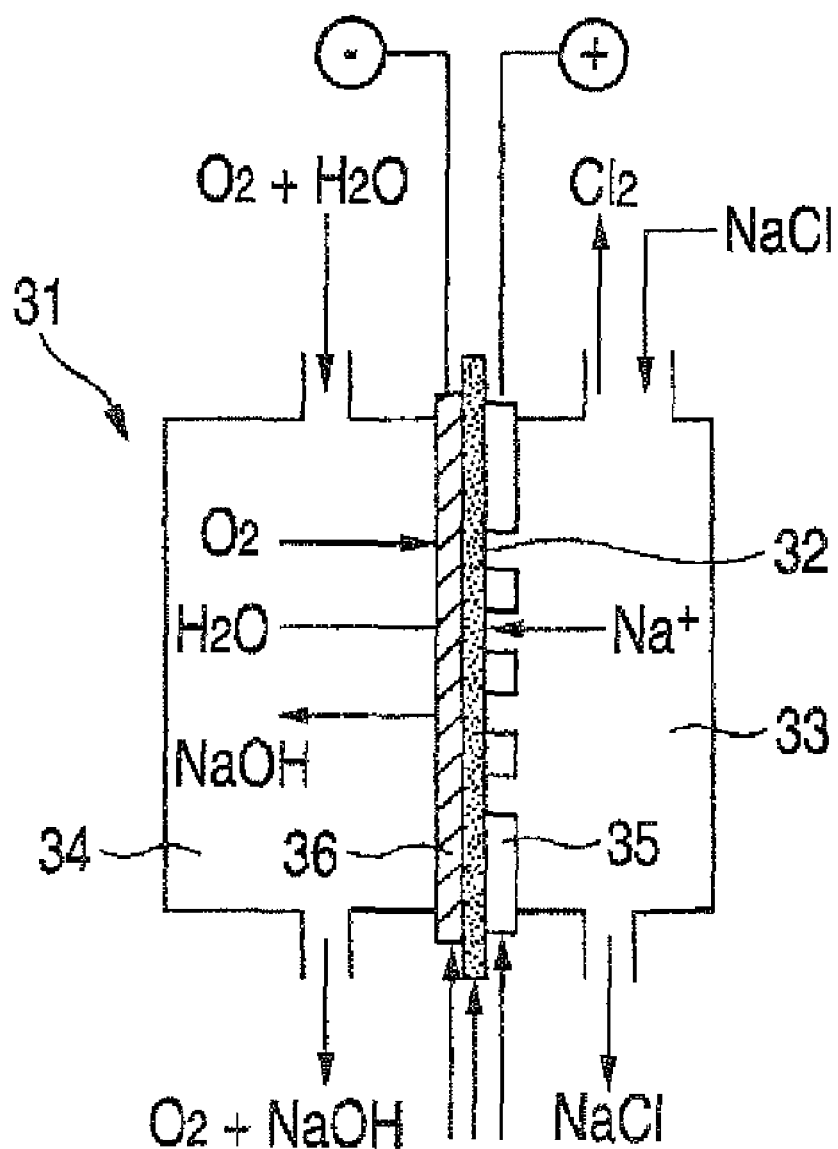
FIG. 3 is a schematic view exemplifying a two-chamber brine electrolytic bath provided a gas diffusion cathode of the invention.

FIG. 3 is a schematic diagram exemplifying a two-chamber (zero-gap type) brine electrolytic bath provided with a gas diffusion cathode of the invention.

The two-chamber electrolytic bath 31 is partitioned into an anode chamber 33 and a cathode gas chamber 34 with a perfluorosulfonate cationic exchange membrane 32. On the anode chamber 33 side of the cation exchange membrane 32, a porous dimension-stabilized anode 35 is brought into intimate contact, and, on the cathode gas chamber 34 side of the cation exchange membrane 32, a gas diffusion cathode 36 having the same constitution with FIG. 3 is disposed in intimate contact.

When energizing between both electrodes while supplying brine and a moistened oxygen-containing gas, respectively, to an anode chamber 33 and cathode gas chamber 34 of the electrolytic bath 31, a sodium ion generated in the anode chamber 33 goes through the cation exchange membrane 32 to reach the gas diffusion cathode 36 in the cathode gas chamber 34. On the other hand, oxygen in an oxygen-containing gas supplied to the cathode gas chamber 34 is reduced to a hydroxy ion due to silver or silver alloy in the electrode catalyst layer of the gas diffusion cathode 36 to combine with the sodium ion to generate sodium hydroxide. The sodium hydroxide is dissolved in water supplied together with an oxygen-containing gas to form an aqueous solution of sodium hydroxide.

The electrolytic bath 31 of FIG. 3 may be provided with a hydrophilic layer between the cation exchange membrane 32 and the gas diffusion cathode 36.

As the ion exchange membrane that is used in the brine electrolytic bath shown in FIGS. 2 and 3, a membrane made of a fluororesin is best suited from the viewpoint of the corrosion resistance. As the anode, a titanium insoluble electrode called DSE or DSA can be preferably used and the anode is preferred to be porous so as to be used in intimate contact with the membrane. When the electrode and the membrane are necessarily brought into intimate contact each other, it is sufficient to previously mechanically combine these or to pressurize these during electrolysis. Pressure in the range of 0.005 to 3 MPa is preferred.

As to the electrolysis conditions, a temperature in the range of 60 to 95° C. is preferred and a current density in the range of 10 to 100 A/dm² is preferred. A supply amount of oxygen is preferred to be 1.05 to 2 times an amount theoretically consumed in the four-electron reduction. As the oxygen gas that is fuel, air is used or a commercially available bomb may be used. However, oxygen concentrated from air by use of a PSA unit may be used. In general, with an increase in the oxygen concentration, the larger current density can be flowed. As needs arise, the oxygen gas is moistened. As a moistening method, a moistening unit heated at a temperature in the range of 70 to 95° C. is disposed at an entrance of a cell. When the oxygen gas is allowed going through, the moistening can be freely controlled. As performance of a presently commercially available membrane, when a concentration of anode water is maintained in the range of 150 to 200 g/L, there is no need of moistening. On the other hand, there is no need of moistening in a newly developed membrane. A concentration of sodium hydroxide is preferred to be in the range of 25 to 40% by weight; however, it is fundamentally determined depending on the characteristics of the membrane.

When the gas diffusion cathode is disposed in the electrolytic bath, in order to support the cathode and to help the electrical continuity, a conductive support can be used. The support is preferred to have appropriate uniformity and the cushioning property. Known materials such as meshes of metals such as nickel and stainless steel, springs, plate springs and webs can be used. When a material other than silver is used, from the viewpoint of the corrosion resistance, silver plating is preferably applied.

As a method of disposing an electrode in the electrolytic bath, under pressure of 0.005 to 3 MPa, the membrane, the gas diffusion cathode and the cathode support are preferably integrated. In the two chamber electrolytic bath, a gas-liquid permeation layer (hydrophilic layer) can be added to improve the performance. The gas-liquid permeation layer interposed between the cathode support and the membrane and gas diffusion cathode are fixed in the positional relationship thereof depending on the elasticity of the cathode support and water pressure difference due to a liquid height of the anode solution. The members may be, before assembling a cell, integrated in advance, followed by clamping, similarly to the membrane, between the cell gaskets or fixing to the support.

When the gas diffusion cathode is used in the brine electrolytic bath, without restricting to a zero-gap two chamber electrolytic bath, in all of the three chamber type and a liquid falling type, the durability can be expected to improve, and thereby the economic efficiency can be largely improved.

EXAMPLES

In the next place, examples of production and usage of an electrode catalyst for electrochemical reaction of the invention will be described. However, it should be understood that the present invention is not to be construed as being limited thereto.

Example 1

Diamond particles (average particle diameter: 40 nm) to which 1000 ppm of boron is added were poured in an aqueous solution of 1 mM of dinitrodiammine platinum, followed by agitating, further followed by drying at 60° C. Thereafter, under flow of 0.1 MPa of 10% $H_2$+90% $N_2$, the mixture was processed at 700° C. for 3 hr to form fine pores on a surface of an electrode. A dimension of fine pores was observed with AFM and found to distribute in the range of 5 to 10 nm and a depth thereof is about 5 nm. Platinum particles on the surface were remained only in diamond pores. An amount of precipitated platinum per gram of diamond was 0.05 g.

The catalyst particles, a slight amount of surfactant (trade name: Triton, produced by Aldrich Co., Ltd.), water, a polymer solid electrolyte solution (trade name: Nifion solution, produced by Aldrich Co., Ltd.) and an aqueous suspension of PTFE fluororesin (trade name: 30J, produced by Mitsui Fluorochemical Co., Ltd.) were added to prepare a slurry (volume ratio of catalyst and resin is 1:1). The slurry was coated on a carbon cloth substrate to form a catalyst and two gas diffusion electrodes were prepared. An amount of diamond of each of the electrodes was set at 100 g/m². An electrode area was 20 cm².

In a gap between the two porous electrodes, polymer solid electrolyte Nafion 112 (trade name) was interposed, followed by hot-pressing at 130° C. for 5 min to integrate. A nickel foam was disposed as an individual current collector on a back side of each of electrodes, followed by clamping by graphite power supply bodies provided with a groove to assemble a cell. Hydrogen and oxygen were supplied to the respective electrode chambers at 10 ml/min. In the hydrogen gas, 100 ppm of CO gas was mixed. With a temperature set at 90° C., relationship between a voltage and a current was measured and a cell voltage of 0.65 V was obtained at current of 20A. After 50 days operation, there was found no deterioration of the cell performance.

Figure 4:
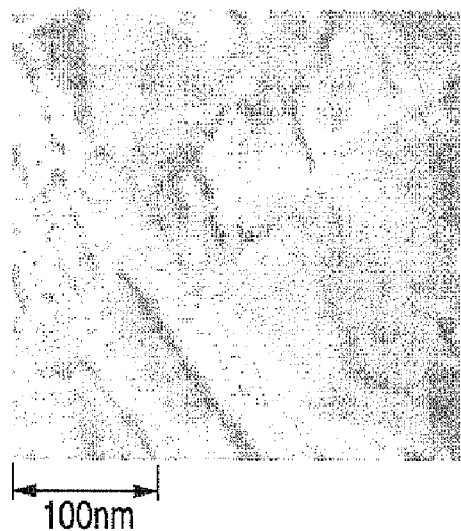
FIG. 4 is a SEM photograph (multiplication: 6000 times) of raw material diamond fine particles used in example 1.
Figure 5:
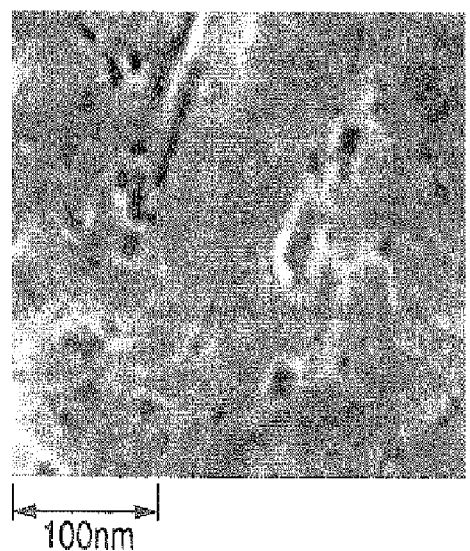
FIG. 5 is a SEM photograph (multiplication: 6000 times) of conductive diamond particles having fine pores generated by a process of example 1.

FIG. 4 shows a SEM photograph (multiplication: 6000 times) of raw material diamond fine particles used in the example. FIG. 5 shows a SEM photograph (multiplication: 6000 times, metal catalyst is removed) of conductive diamond particles having fine pores generated by a treatment of the example. It is found from the photographs that fine pores of several tens nanometers are generated.

Figure 6:
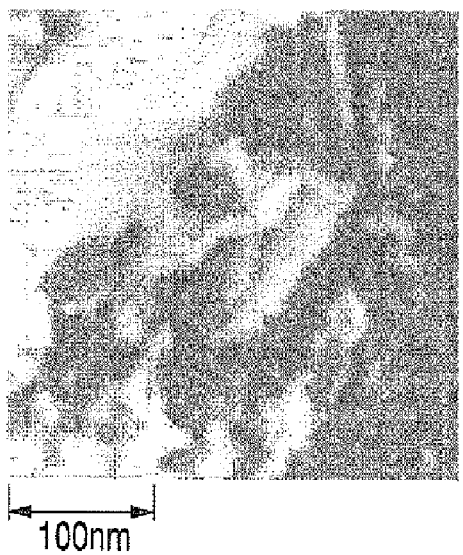
FIG. 6 is a SEM photograph (multiplication: 6000 times) of catalyst particles generated on a diamond surface by a heat treatment of example 1.
Figure 7:
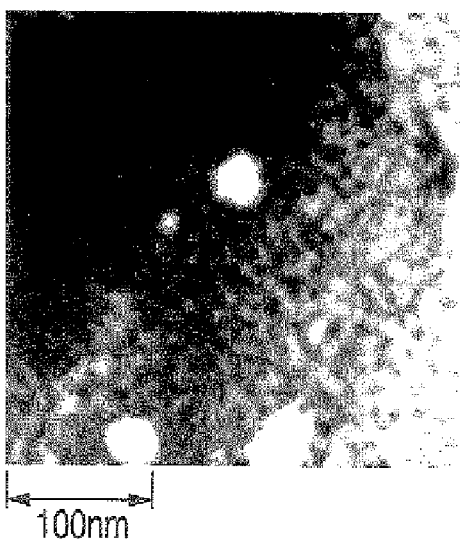
FIG. 7 is a SEM reflection image photograph (multiplication: 6000 times) of catalyst particles generated on a diamond surface by a heat treatment of example 1.

FIGS. 6 and 7, respectively, show a SEM photograph and a SEM reflection image photograph (multiplication: 6000 times for both) of catalyst particles generated on a surface of diamond according to a heat treatment of the example. From FIG. 7, it is found that white particles are precipitated catalyst.

Comparative Example 1

With a commercially available gas diffusion electrode (ELAT) in which on furnace black particles having an average particle diameter of 50 nm a catalyst containing 5% by weight of platinum is formed at 100 g/m² as an electrode, similarly to example 1, a fuel cell test was carried out. The relationship between a voltage and a current was measured and a cell voltage of 0.65 V was obtained at current of 20A. After 50 days operation, the cell voltage was lowered to 0.6 V, that is, the performance was deteriorated.

Example 2

Diamond particles same as that of example 1 were added to a mixed aqueous solution of 1 mM of ruthenium nitrate and 1 mM of dinitrodiammine platinum, followed by agitating, further followed by drying at 60° C. The mixture was processed at 600° C. for 5 min under flow of 0.1 MPa of 10% $H_2O$ and 90% $N_2$ and thereby metal particles were precipitated.

After that, when processed for 5 hr under the same conditions, fine pores were formed on an electrode surface. Diameters of the fine pores were distributed in the range of 3 to 10 nm and the depth was about 3 nm. The catalyst particles on the surface were remained only in the diamond pores. An amount of precipitated catalyst per gram of diamond was 0.08 g. Similarly to example 1, a fuel cell test was carried out. The relationship between a voltage and a current was measured and a cell voltage of 0.68 V was obtained at current of 20A. After 50 days operation, there was found no deterioration of the cell performance.

Example 3

Diamond powder containing 200 ppm of boron was prepared by means of a high pressure method. An average particle diameter of prepared powder was 1 μm. The powder was dipped in an aqueous solution of 1 mM of dinitrodiammine platinum, followed by processing at 600° C. for 20 min under flow of 0.1 MPa of 10% $H_2$ and 90% $N_2$, and thereby metal fine particles were precipitated. Thereafter, the powder was processed at 750° C. for 2 hr under flow of 0.1 MPa of 10% $H_2O$ and 90% $N_2$, and it was observed with a SEM that fine pores were formed on an electrode surface. Diameters of the fine pores were distributed in the range of 10 to 20 nm and the depth thereof was about 10 nm. The catalyst particles on the surface were remained only in the diamond pores. An amount of precipitated catalyst per gram of diamond was 0.05 g. Similarly to example 1, a fuel cell test was carried out. The relationship between a voltage and a current was measured and a cell voltage of 0.55 V was obtained at current of 20 A. After 50 days operation, there was found no deterioration of the cell performance.

Example 4

Diamond particles same as example 1 were added to an aqueous solution of 1 mM of silver nitrate, followed by agitating, further followed by drying at 60° C. The mixture was processed at 600° C. for 5 min under flow of 0.1 MPa of 10% $H_2O$ and 90% $N_2$ and thereby metal fine particles were precipitated. After that, when processed for 5 hr under the same conditions, fine pores were formed on an electrode surface. Diameters of the fine pores were distributed in the range of 3 to 10 nm and the depth was about 5 nm. Silver particles on the surface were remained only in the diamond pores. An amount of precipitated silver per gram of diamond was 0.1 g. The diamond particles and an aqueous suspension of PTFE (trade name: 30J, produced by Mitsui Fluorochemical Co., Ltd.) were blended so that a volume ratio of the powder and the suspension may be 1:1. Furthermore, in water where Triton equivalent to 2% by weight to an entire mixture is dissolved, the mixture was sufficiently blended, followed by coating the solution on a carbon cloth substrate having a thickness of 0.4 mm so as to be 500 g per projected area (m²), further followed by calcining in an electric furnace at 310° C. for 15 min, still further followed by applying press forming at pressure of 0.2 MPa by use of a press machine, and thereby a gas diffusion cathode was prepared.

With DSE (trade name, produced by Permelec Electrode Ltd.) mainly made of ruthenium oxide as an anode and Flemion F8020 (trade name, produced by Asahi Glass Co., Ltd.) as an ion exchange membrane, and with a hydrophilicized carbon cloth with a thickness of 0.4 mm as a hydrophilic layer, the hydrophilic layer was interposed between the gas diffusion cathode and the ion exchange membrane, followed by pressing inwards the anode and the gas diffusion cathode to fix the respective members in intimate contact so that the ion exchange membrane may be positioned in a vertical direction, thereby an electrolytic bath was formed.

With a sodium chloride concentration of the anode chamber controlled so that a sodium hydroxide concentration of the cathode chamber may be 32% by weight, oxygen gas supplied to the cathode at a rate of about 1.2 times a theoretical value, a liquid temperature of the anode solution set at 90° C. and a current density set at 60 A/dm², the electrolysis was carried out. An initial cell voltage was 2.14V. After 50 days operation, it was found that there were no uprise in the cell voltage and overvoltage and the current efficiency was maintained at about 95%.

Comparative Example 2

Except that a volume ratio of silver particles (trade name: AgC—H, produced by Fukuda Metal Foil Industry Co.,) and a fluororesin was set at 1:1 and a coating amount a unit projection area was set at 600 g/m², similarly to example 4, the electrolysis test was carried out. The cell voltage was found increased within 50 days from an initial value of 2.16V to 2.18V While the present invention has been described in detail and with reference to specific embodiments thereof, it will be apparent to one skilled in the art that various changes and modifications can be made therein without departing from the spirit and scope thereof.

The present application is based on Japanese Patent Application No. 2006-063586 filed on Mar. 9, 2006, and the contents thereof are incorporated herein by reference.

What is claimed is:

1. A process for producing an electrode catalyst for electrochemical reaction, the process comprising:

forming a thin layer containing a carbon-reactive catalyst metal component on a conductive diamond particle as a base material; and heat-treating the conductive diamond particle having the thin layer in a reducing gas atmosphere to carry out a carbon reducing reaction due to the catalyst metal so as to form fine pores on a surface of the conductive diamond particle and to carry the catalyst metal in the fine pores, said reducing gas atmosphere comprising hydrogen blended with nitrogen in a ratio of 3 to 30% and 70 to 97%, respectively.

2. The process for producing an electrode catalyst according to claim 1, wherein a temperature of the heat-treatment is 600 to 900° C.

* * * * *